United States Patent
Ljolje (10) Patent No.: US 8,204,359 B2
(45) Date of Patent: Jun. 19, 2012

(54) SYSTEMS AND METHODS OF PROVIDING MODIFIED MEDIA CONTENT

(75) Inventor: Andrej Ljolje, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 536 days.

(21) Appl. No.: 11/725,979

(22) Filed: Mar. 20, 2007

(65) Prior Publication Data

US 2008/0232775 A1    Sep. 25, 2008

(51) Int. Cl.
*H04N 9/80* (2006.01)

(52) U.S. Cl. ........... 386/241; 386/248; 386/262; 725/32

(58) Field of Classification Search ................... 725/139, 725/151, 90; 382/170, 173–180; 386/368, 386/369; 704/251, 253, 254, 233, 273
See application file for complete search history.

(56) References Cited

U.S. PATENT DOCUMENTS

| | | | |
|---|---|---|---|
| 5,809,454 A * | 9/1998 | Okada et al. ................... 704/214 |
| 5,995,153 A * | 11/1999 | Moeller et al. ........... 375/240.01 |
| 6,697,564 B1 * | 2/2004 | Toklu et al. ................... 386/285 |
| 6,728,678 B2 * | 4/2004 | Bhadkamkar et al. ........ 704/270 |
| 7,046,911 B2 * | 5/2006 | Zimmerman et al. .......... 386/68 |
| 7,155,109 B2 | 12/2006 | Gates et al. |
| 7,177,810 B2 * | 2/2007 | Shriberg et al. ............... 704/253 |
| 7,293,280 B1 * | 11/2007 | Gupta et al. ................... 725/139 |
| 7,612,832 B2 * | 11/2009 | Zhang et al. ................... 348/700 |
| 2003/0182662 A1 | 9/2003 | Nishio et al. |
| 2004/0044525 A1 * | 3/2004 | Vinton et al. ................. 704/224 |
| 2004/0186726 A1 * | 9/2004 | Grosvenor .................... 704/275 |
| 2005/0159956 A1 * | 7/2005 | Rui et al. ....................... 704/275 |
| 2006/0026628 A1 * | 2/2006 | Wan et al. ........................ 725/32 |
| 2006/0206324 A1 | 9/2006 | Skilling et al. |
| 2007/0040847 A1 * | 2/2007 | Thebault et al. .............. 345/616 |

\* cited by examiner

*Primary Examiner* — Pankaj Kumar
*Assistant Examiner* — Timothy Newlin
(74) *Attorney, Agent, or Firm* — Toler Law Group, PC (57) ABSTRACT

In an embodiment, a method of providing modified media content is disclosed and includes receiving media content that includes audio data and video data having a first number of video frames. The method also includes generating abstracted media content that includes portions of the video data and audio elements of the audio data, where the abstracted media content includes less than all of the video data and includes fewer video frames than the first number of video frames.

25 Claims, 10 Drawing Sheets

SYSTEMS AND METHODS OF PROVIDING MODIFIED MEDIA CONTENT

FIELD OF THE DISCLOSURE

The present disclosure is generally related to systems and methods for providing modified media content.

BACKGROUND

Media content such as movies and other video presentations typically include audio content and video content. Current playback systems including digital video recorders (DVRs), video cassette recorders (VCRs), Digital Video Disc (DVD) players, and other playback devices may provide for playback speeds that are higher than a recorded rate. However, when played back at speeds exceeding the recorded rate, the playback system typically provides samples of video in rapid succession without an audio track.

DETAILED DESCRIPTION OF THE DRAWINGS

In a particular embodiment, a method of providing modified media content is disclosed. The method includes receiving media content that includes audio data and video data having a first number of video frames. The method includes generating abstracted media content that includes portions of the video data and audio elements of the audio data, where the abstracted media content includes less than all of the video data and includes fewer video frames than the first number of video frames.

In another particular embodiment, a set-top box device is disclosed. The set-top box device includes a processor to execute instructions stored in a memory accessible to the processor. The set-top box device memory includes media content storage to store media content including audio data and video data having a first number of video frames. The memory also includes an abstracting module including instructions executable by the processor to generate abstracted media content that includes portions of the video data and audio elements of the audio data. The abstracted media content includes less than all of the stored video data.

In another particular embodiment, a system is disclosed including media content storage to store media content including audio data and video data having a first number of video frames. The system an abstracting module including instructions executable by the processor to generate abstracted media content that includes portions of the video data and audio elements of the audio data. The abstracted media content includes less than all of the stored video data. The system also includes an output interface to output the abstracted media content to a destination device via a video distribution network.

Figure 1:
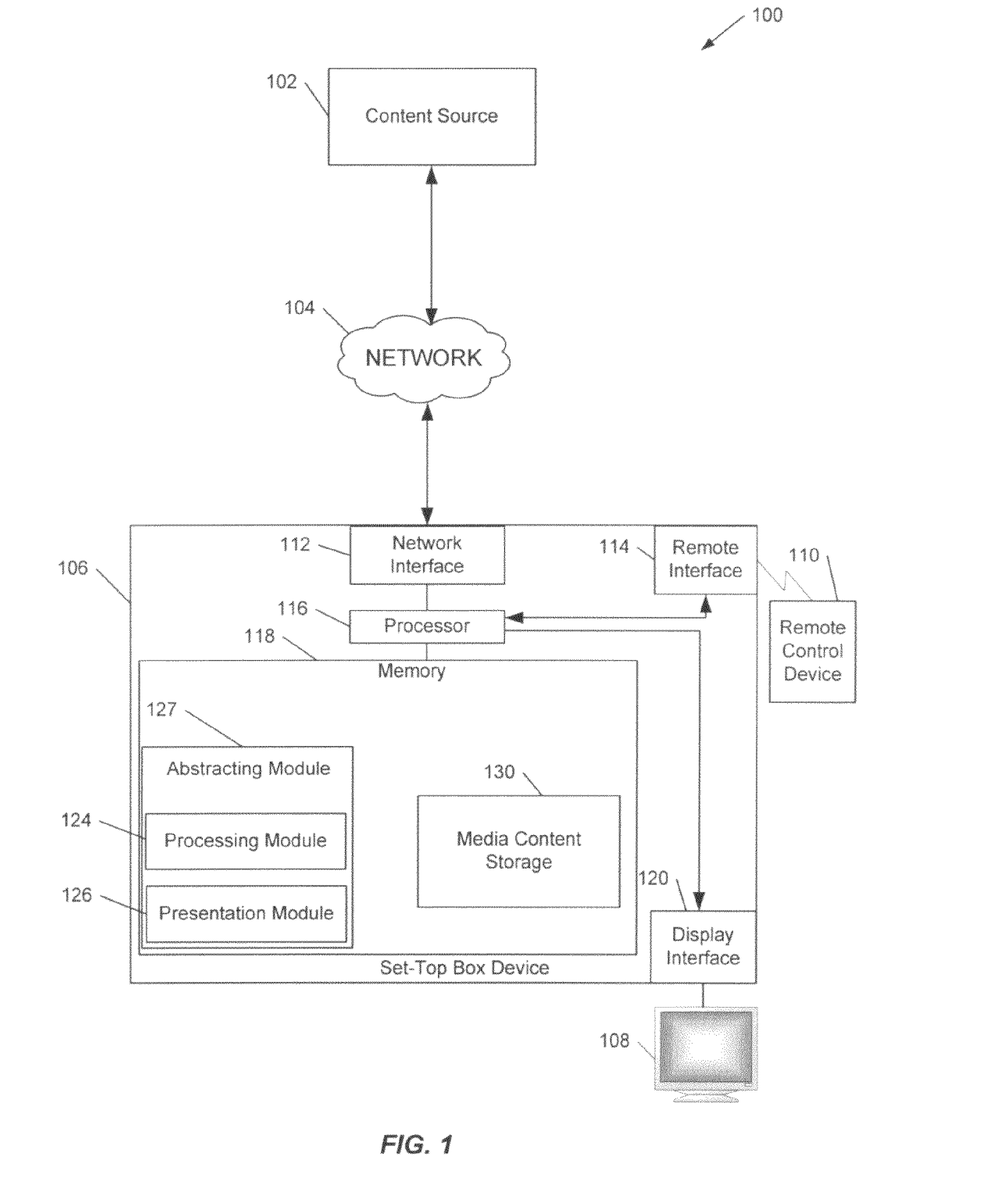
FIG. 1 is a block diagram of a particular illustrative embodiment of a system to provide modified media content.

FIG. 1 is a block diagram of a particular illustrative embodiment of a system to provide modified media content. The system 100 includes a content source 102, a network 104, and a set-top box device 106. The network 104 can be a content delivery network such as an access network of an Internet Protocol Television (IPTV) system, a satellite network, a cable television network, or any combination thereof. The system also includes a display device 108 coupled to the set-top device 106 via a display interface 120, and a remote control device 110 communicatively coupled to the set-top box device 106 via a remote interface 114.

In a particular illustrative embodiment, a user may select media content via the remote control device 110. The set-top box device 106 may receive the media content selection via the remote interface 114 and may send data related to the media content selection to the content source 102 via the network 104. The content source 102, in response to receiving the data related to the selected media content, sends the selected media content to the set-top box device 106. In a particular illustrative embodiment, the media content is received as a downloaded file. In a particular embodiment, the set-top box device 106 receives the media content including audio data and video data from the content source 102 via the network 104. In another particular illustrative embodiment, the media content is received as streaming media.

In another particular illustrative embodiment, the media content may be provided to the set-top box device 106 locally, such as from a digital versatile disc (DVD) or another electronic device, another media content storage medium, or any combination thereof. The media content may be received by the set-top box device 106 via an input interface (not shown). In a particular illustrative embodiment, a user may provide the media content to the set-top box device 106.

The set-top box device 106 includes a processor 116, a memory 118 coupled to the processor 116, and a network interface 112 coupled to the processor 116. The processor 116 may store the received media content in media content storage 130 within the memory 118. The stored media content can include audio data and video data having a first number of video frames.

In a particular embodiment, the memory 118 includes an abstracting module 127. The processor 116 may execute instructions associated with the abstracting module 127 to generate abstracted media content. The abstracted media content includes portions of the video data having a second number of video frames. In a particular embodiment, the abstracted media content includes less video content than the stored media content. For example, the abstracted media content may include a second number of video frames, where the second number of video frames is less than the first number of video frames of the video data.

The abstracted media content also includes audio elements of the stored audio data. The audio data of the media content may be divided into audio segments, and each audio element may be selected from the one or more audio segments that make up the audio data. In a particular embodiment, the set top box device 106 includes a processing module 124 including instructions executable by the processor 116 to identify the one or more audio segments of the stored audio data.

In a particular illustrative embodiment, the audio segments include language segments and non-language segments. A language segment may include one or more words. In a particular embodiment, the processing module 124 includes instructions to perform a textual transcription of the audio data. In a particular illustrative example, the language segment may include several words spoken by an actor appearing in the media content. In a particular illustrative embodiment, one of the non-language segments may include non-speech audio content. For example, one of the non-language segments can include background music. In a particular illustrative embodiment, each language segment is terminated on at least one of two language segment ends by a non-language segment, and each non-language segment is terminated on at least one of two non-language segment ends by a language segment.

The processing module 124 can also include instructions to assign a priority value to each audio segment and identify the audio segments whose priority value exceeds a base priority value as the audio elements. In a particular illustrative embodiment, the priority value of an audio segment is determined by applying one or more techniques to evaluate an importance of a word relative to other audio data. For example, an audio segment having a greater importance relative to the other audio data can have a greater priority value.

In a particular illustrative embodiment, the base priority value is based at least in part on the first number of video frames and the second number of video frames. For example, if the first number of video frames is 100 times greater than the second number of video frames, then the base priority value may be a relatively large number. A large base priority value can result in less audio elements. In another example, if the first number of video frames is two times the second number of video frames, then the base priority value may be a relatively small number, which can result in a greater number of audio elements in the abstracted media content. In another particular illustrative embodiment the base priority value may be based at least in part on user input, other factors, or any combination thereof.

In a particular illustrative embodiment, the processor 116 executes instructions included in the abstracting module 127 to select the portions of the video data to be included in the abstracted media content. The portions of the video data can be selected based at least in part upon the audio elements that have been identified. For example, an audio segment of the media content may be identified as an audio element. The audio segment may be associated with specific frames of the video data. Some or all of the specific frames of the video data may be included as a selected portion of the video data in the abstracted media content.

In a particular illustrative embodiment, the abstracting module 127 can include instructions to preserve a pitch range of each of the audio elements at approximately a recorded pitch range. The recorded pitch range is a pitch range of the audio data when played at a recorded rate.

In a particular embodiment, the set-top box device 106 includes a presentation module 126. In a particular embodiment, the processor 116 may execute instructions associated with the presentation module 126 to concatenate each of the audio elements, producing concatenated audio elements, and to concatenate the selected portions of the video data, producing concatenated video portions. In a particular embodiment, the processor 116 may also execute instructions associated with the presentation module 126 to synchronize each concatenated audio element with a corresponding frame of the concatenated video portions, and to provide the concatenated audio elements and the concatenated video portions to the display device 108 via an output interface such as the display interface 120.

Figure 2:
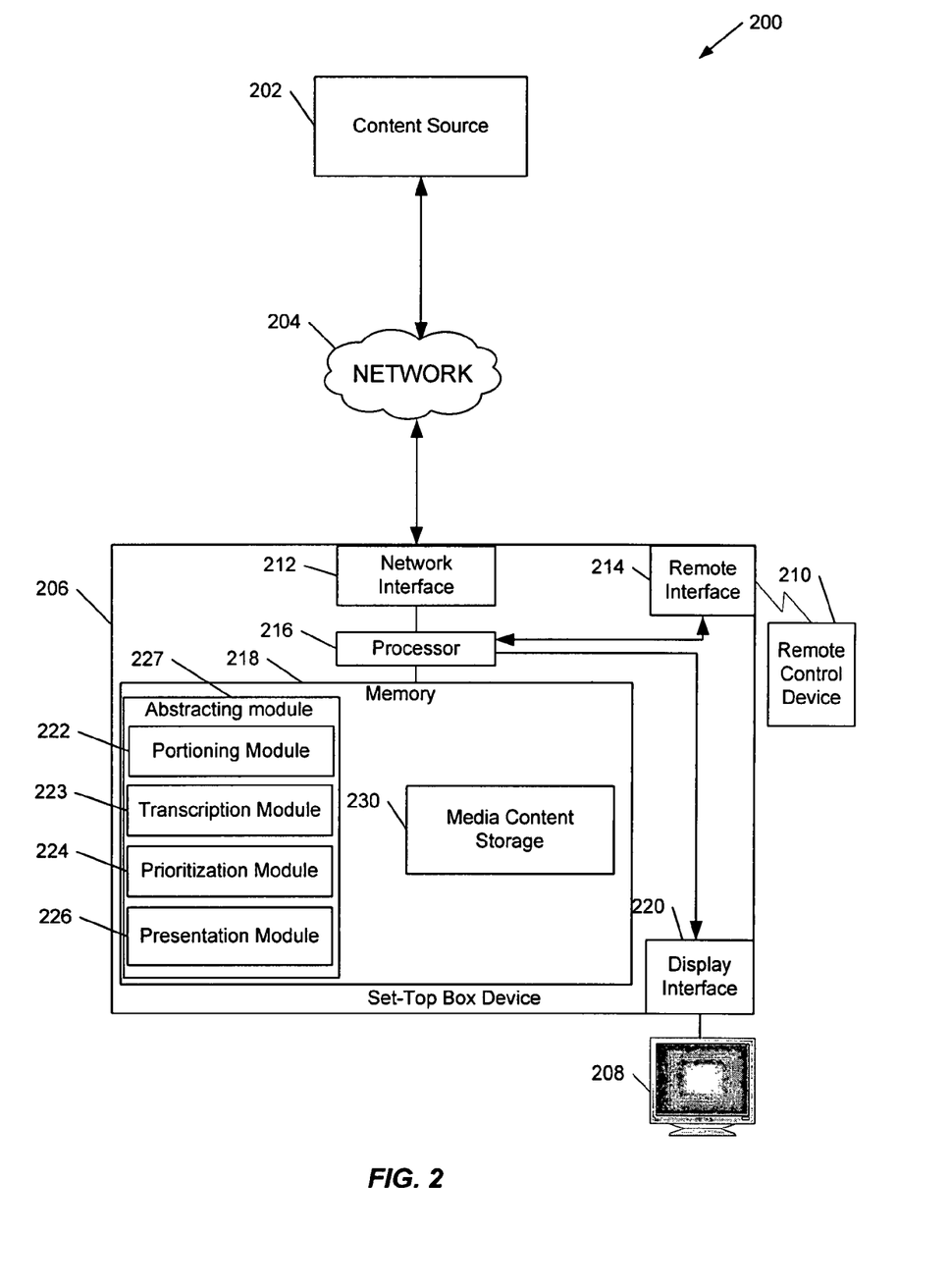
FIG. 2 is a block diagram of a second particular illustrative embodiment of a system to provide modified media content.

FIG. 2 is a block diagram of a second particular illustrative embodiment of a system to provide modified media content. The system 200 includes a content source 202, a network 204, and a set-top box device 206. The network 204 can be a content delivery network, such as an access network of an Internet Protocol Television (IPTV) system, a satellite network, a cable television network, or any combination thereof. The system also includes a display device 208 coupled to the set-top device 206 via a display interface 220 and a remote control device 210 communicatively coupled to the set-top box device 206 via a remote interface 214.

In a particular embodiment, the set-top box device 206 may receive media content including audio data and video data from the content source 202 via the network 204. In a particular illustrative embodiment, a user may select the media content via the remote control device 210. The set-top box device 206 may receive the media content selection via the remote interface 214 and may send data related to the media content selection to the content source 202 via the network 204. The content source 202, in response to receiving the data related to the selected media content, may send the selected media content to the set-top box device 206.

In another particular illustrative embodiment, the media content may be provided to the set-top box device 206 locally, such as from a digital versatile disc (DVD) or another electronic device, another media content storage medium, or any combination thereof. The media content may be received by the set-top box device 206 via an input interface (not shown). In a particular illustrative embodiment, the user may provide the media content to the set-top box device 206.

The set-top box device 206 includes a processor 216, a memory 218 coupled to the processor 216, and a network interface 212 coupled to the processor 216. In a particular embodiment, the set-top box device 206 may receive the media content from the content source 202 via the network 204, and the processor 216 may store the received media content in media content storage 230 within the memory 218. The stored media content has a recorded rate and includes audio data and video data having a first number of video frames.

In a particular embodiment, the memory 218 includes an abstracting module 227 including a portioning module 222, a transcription module 223, a prioritization module 224, and a presentation module 226. In a particular embodiment, the processor 216 may execute instructions associated with the portioning module 222 to scan the audio data at a scanning rate. In a particular illustrative embodiment, the scanning rate is at least twice the recorded rate. The processor 216 may identify one or more audio segments including language and non-language segments. Each language segment can include an audio segment that includes language and has an associated portion of the video data. The processor 216 may also identify one or more non-language segments. Each non-language segment can include an audio segment in which no language is included, and each non-language segment has an associated portion of the video data.

In a particular illustrative embodiment, the instructions in the portioning module 222 may employ one of a number of different techniques to identify language segments and non-language segments. In a particular illustrative embodiment, the portioning module 222 includes instructions to identify each language segment by selecting those segments of the audio data having associated closed captioning data. In another illustrative embodiment, the portioning module 222 includes instructions to perform the scanning operation using one or more speech recognition techniques to identify the language segments and the non-language segments.

In a particular embodiment, the processor 216 executes instructions associated with the prioritization module 224 to assign a priority value to each audio segment, including language segments and non-language segments. In a particular embodiment the processor 216, executing instructions associated with the transcription module 223, may provide a lexical transcription of the language segments using techniques that may include large vocabulary continuous speech recognition (LVCSR), other techniques, or any combination thereof. The processor 216 can determine the priority value of a particular language segment by evaluating characteristics that can include information bearing of individual words, prominence that may be based on prosodic correlates, and other factors, to indicate an importance of a word relative to other audio data within the media content. Some techniques that may be employed to evaluate individual words for importance relative to the audio material of the media content can include techniques used in the fields of natural language processing, information retrieval, machine learning, topic classification, other techniques, or any combination thereof. In a particular embodiment, the processor 216 can determine the priority value for a non-language segment by evaluating factors that can include a sound volume envelope, a frequency content, a time derivative of the sound volume, a time derivative of the frequency content, other factors, or any combination thereof.

In a particular embodiment, the processor 216 may select as audio elements those segments having a priority value exceeding a base priority value. In a particular illustrative embodiment, the base priority value may be pre-determined, and may be associated with the scanning rate. In another particular illustrative embodiment, the base priority value can be selected by a user. In yet another particular illustrative embodiment the base priority value can be selected based at least in part on the scanning rate, user input, other factors, or any combination thereof.

In a particular embodiment, the processor 216 may execute instructions associated with a presentation module 226 to provide the one or more audio elements and associated portions of the video data to the display device 208 for playback at a presentation rate that is slower than the scanning rate. In a particular embodiment, the processor 216 may provide concatenated portions prior to displaying, by concatenating the audio elements to form a concatenated audio portion, and concatenating the associated portions of the video data to form a concatenated video portion. In a particular illustrative embodiment, the processor 216 may synchronize each audio element with its associated portion of video data. In a particular illustrative embodiment, the processor 216 may provide the concatenated portions including concatenated audio portions and concatenated video portions to the display device 208 for playback at the presentation rate. In a particular illustrative embodiment, the processor 216 may store the concatenated portions in the media content storage 230. In a particular illustrative embodiment, the concatenated portions may be provided to the display device 208 upon request. In another particular illustrative embodiment, the concatenated portions may be provided by a sending to another destination device via the network 204.

In a particular embodiment, the presentation rate may be substantially equal to the recorded rate. In another particular embodiment, the presentation rate may be selected by the user. For example, the user may wish to view the concatenated portions at the recorded rate, or at a rate that may be faster or slower than the recorded rate.

In a particular illustrative embodiment, a pitch associated with words spoken in one or more relevant phrases may be preserved at the pitch as recorded, i.e., the pitch heard when the audio data is played back at the recorded rate. By preserving the pitch at the recorded rate, the speech heard at the playback rate can sound "normal." For example, the user may request the presentation rate to be faster than the recorded rate. By preserving the pitch associated with audio elements, spoken words may be heard without a "chipmunk effect" that can otherwise be a characteristic associated with presenting audio data at a faster rate than the recorded rate. One method of pitch preservation can include modifying the audio data such that a first audio pitch range of the audio data as recorded is similar to a second audio pitch range of the modified audio data played at the presentation rate, i.e. the pitch range is preserved during playback at fast-forward or slowdown playback speeds. A pitch range may represent a range of frequencies of an audio signal corresponding to the audio data.

There are a variety of techniques, including non-linear transformation techniques that may be employed for preserving a pitch of speech while changing a speaking rate. Techniques that may be employed include Waveform Similarity OverLap-Add (WSOLA) Technique and Pitch Synchronous OverLap Add (PSOLA) Technique, frequency domain techniques such as Linear Predictive Coding (LPC), Harmonic Plus Noise Model (HNM) techniques, other pitch correcting techniques, or any combination thereof.

In a particular embodiment, the processor 216 may insert white noise between audio elements. In another illustrative embodiment, the processor 216 may insert a substantially blank (i.e., quiet) audio spacer between audio elements.

Figure 3:
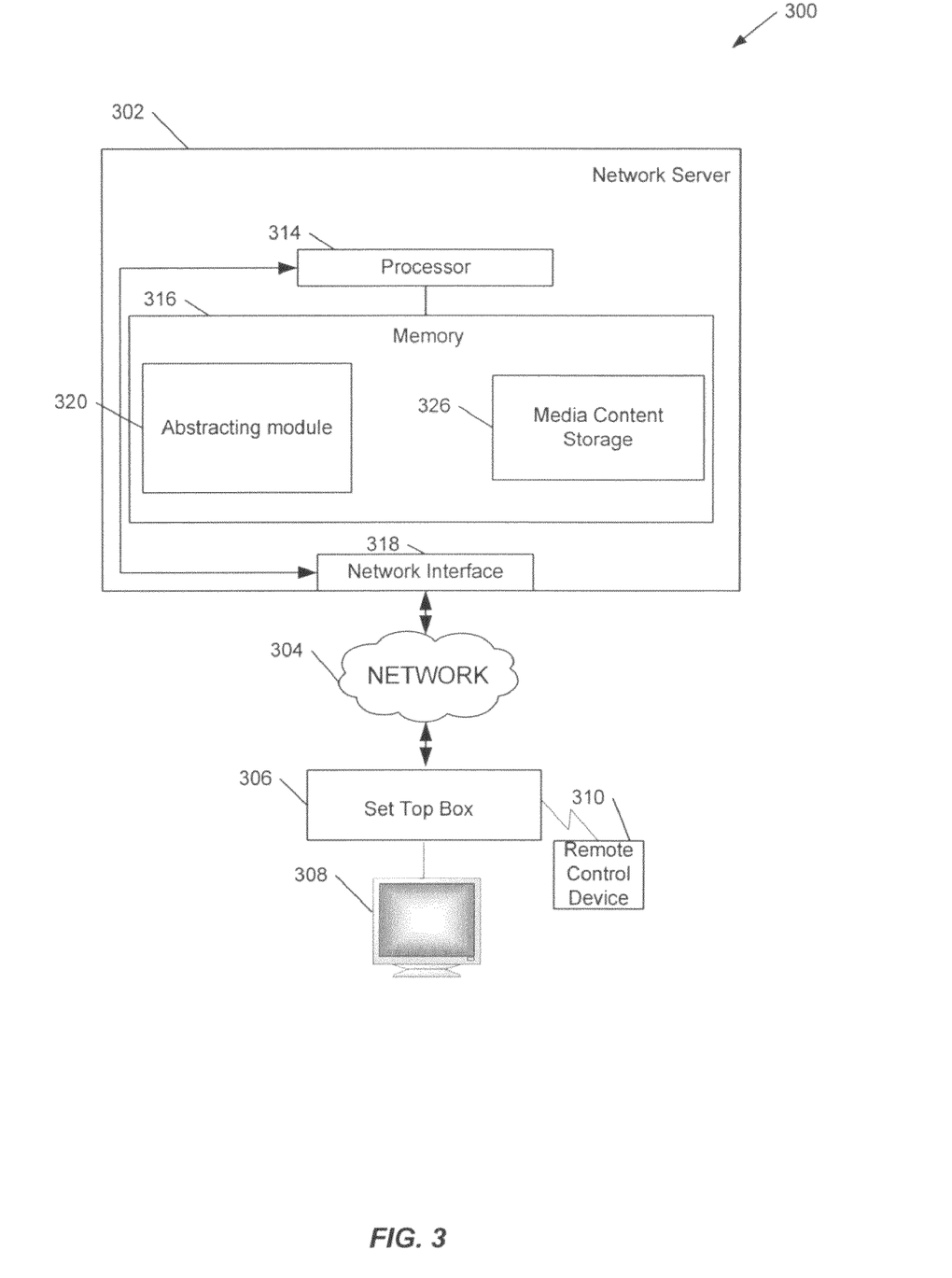
FIG. 3 is a block diagram of a third particular illustrative embodiment of a system to provide modified media content.

FIG. 3 is a block diagram of a third particular illustrative embodiment of a system to provide modified media content. The system 300 includes a network server 302 that communicates with a set-top box device 306 via a network 304. The network server 302 can include a content source. The network 304 can be a content delivery network, such as an access network of an IPTV system, a satellite network, a cable television network, or any combination thereof. The system 300 also includes a display device 308 coupled to the set-top box device 306 and a remote control device 310 communicating with the set-top box device 306.

In a particular illustrative embodiment, a user may select media content via the remote control device 310. The set-top box device 306 may receive the user selection of media content and may provide data related to the user selection to the network server 302 via the network 304.

The network server 302 includes a processor 314, a memory 316, and a network interface 318. The memory includes an abstracting module 320 and media content storage 326. In a particular illustrative embodiment, the processor 314 may retrieve the user selected media content from the media content storage 326. In another particular illustrative embodiment, the network server 302 may retrieve the media content from another source via the network 304. The media content can include audio data and video data having a first number of video frames.

The abstracting module 320 is executable by the processor 314 to generate abstracted media content that includes portions of the video data and audio elements of the audio data. The abstracted media content can have a second number of frames, and includes less video content than the first number of frames. In a particular embodiment, the first number of frames is greater than or equal to approximately twice the second number of frames. In another particular embodiment, first number of frames is greater than or equal to approximately ten times the second number of frames.

In a particular illustrative embodiment, the processor 314 may execute instructions associated with the abstracting module 320 to identify the audio elements within the audio data. The processor 314 may execute instructions associated with the abstracting module 320 to assign a priority value to each audio segment, including language segments and non-language segments. The processor 314 may identify as audio elements those audio segments having a priority value that exceeds a base priority value.

In a particular illustrative embodiment, the abstracting module 320 may include instructions executable by the processor 314 to preserve a pitch range associated with one or more corresponding audio elements. In a particular embodiment, the abstracting module 320 may include instructions executable by the processor 314 to add white noise between audio elements. In another particular illustrative embodiment, the abstracting module 320 may include instructions executable by the processor 314 to introduce a blank audio spacer between audio elements.

In a particular illustrative embodiment, the processor 314 can execute instructions associated with the abstracting module 320 to select the portions of the video data to be included in the abstracted media content. The portions of the video data can be selected based at least in part on the identified audio elements.

The processor 314 may provide the abstracted media content to the set-top box device 306 via the network 304. In a particular illustrative embodiment, the processor 314 may concatenate the one or more audio elements and the portions of the video data prior to providing the abstracted media content. The processor 314 may also synchronize each concatenated audio element with a corresponding frame of one of the concatenated video portions.

In a particular illustrative embodiment, the network interface 318 can be an output interface to output the abstracted media content to a destination device via the network 304. In a particular illustrative embodiment, the destination device can be the set-top box device 306. In another particular illustrative embodiment, the processor 314 may store the abstracted media content in the media content storage 326, to be outputted by the network interface 318 at a later time and transmitted to, e.g., the display device 308, or to another destination device, via the network 304.

Figure 4:
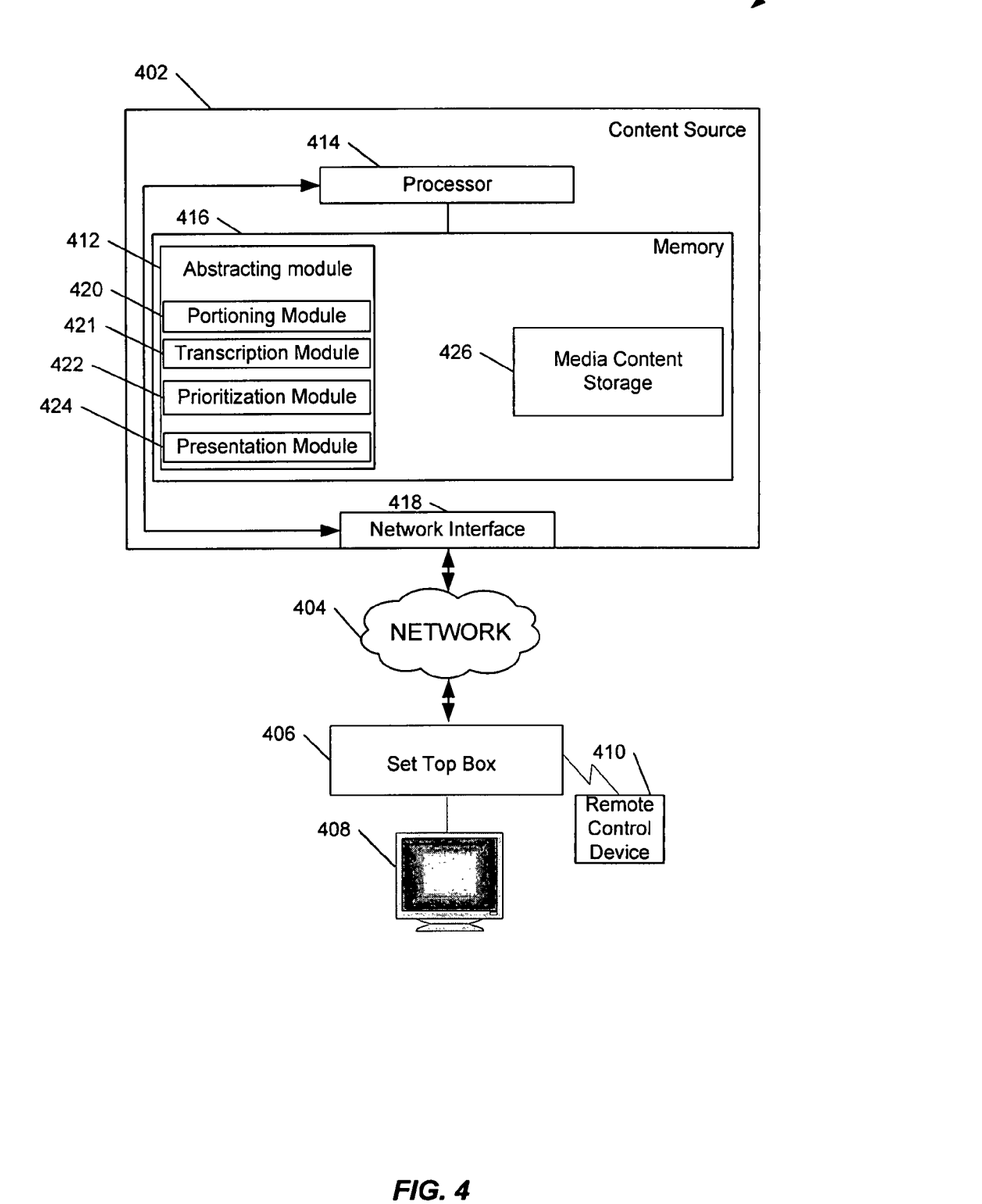
FIG. 4 is a block diagram of a fourth particular illustrative embodiment of a system to provide modified media content.

FIG. 4 is a block diagram of a fourth particular illustrative embodiment of a system to provide modified media content. The system 400 includes a content source 402 that communicates with a set-top box device 406 via a network 404. The content source 402 includes a processor 414, a memory 416, and a network interface 418. The network 404 can be a video distribution network, such as an access network of an IPTV system, a satellite network, a cable television network, or any combination thereof. The system 400 also includes a display device 408 coupled to the set-top box device 406 and a remote control device 410 communicating with the set-top box device 406.

In a particular illustrative embodiment, a user may select media content from, e.g., an electronic program guide, via the remote control device 410. The set-top box device 406 may receive the user selection of media content and may provide data related to the user selection to the content source 402 via the network 404. The processor 414 may retrieve the user selected media content including audio data and video data from the media content storage 426. In a particular illustrative embodiment, the content source 402 may retrieve the media content from another source via the network 404.

In a particular illustrative embodiment, the user may select a scanning rate via, e.g., the remote control device 410, which communicates the selection to the set-top box device 406. The set-top box device 406 may transmit data related to the user-selected scanning rate to the content source 402 via the network 404.

In an illustrative embodiment, the memory 416 can include an abstracting module 412 that includes a portioning module 420, a transcription module 421, a prioritization module 422, and a presentation module 424. In a particular embodiment, the processor 414 may execute instructions associated with the portioning module 420 to identify one or more audio segments including language segments and non-language segments by scanning the audio data. In a particular illustrative embodiment, the processor 414, executing instructions associated with the portioning module 420, may scan the audio data at a scanning rate that is at least twice a recorded rate of the media content. In a particular illustrative embodiment, the processor 414 may scan the audio data at the user selected scanning rate. In a particular illustrative embodiment, the processor 414 may identify one or more language segments and one or more non-language segments. Each audio segment can have an associated portion of the video data.

In a particular embodiment, the processor 414 may execute instructions associated with the prioritization module 424 to identify audio elements within the audio data. In a particular embodiment, the processor 414 may execute instructions associated with the prioritization module 424 to assign a priority value to each audio segment. The processor 414 may select those audio segments having a priority value exceeding a base priority value to be audio elements. In a particular illustrative embodiment, the base priority value can be associated with the scanning rate. In another particular illustrative embodiment, the base priority value can be selected by a user. In yet another particular illustrative embodiment the base priority value can be selected based at least in part on the scanning rate, user input, other factors, or any combination thereof.

In a particular embodiment, the processor 414 may execute instructions associated with the presentation module 424 to provide one or more audio elements and associated portions of the video data to the set-top box device 406 via the network 404 for playback at a presentation rate that is slower than the scanning rate. In a particular embodiment, the processor 414 can provide concatenated portions, including concatenated audio elements and concatenated video portions, by concatenating the one or more audio elements to form the concatenated audio portion, and concatenating the associated portions of the video data to form the concatenated video portion. In a particular illustrative embodiment, the processor 414 may synchronize each audio element with its associated portion of the video data.

In a particular embodiment, the network interface 418 may transmit the concatenated portions to the set-top box device 406 via the network 404. In a particular illustrative embodiment, the set-top box device 406 may transmit the concatenated portions to the display device 408 for playback at the presentation rate. In another particular illustrative embodiment, the processor 414 may store the concatenated portions in the media content storage 426, to be outputted by the network interface 418 at a later time and transmitted to the display device 408, or to another destination device, via the network 404.

In a particular embodiment, the presentation rate may be substantially equal to the recorded rate. In addition, the presentation rate may be selected by the user. For example, the user may wish to view the concatenated portions at the recorded rate, or at a rate that may be faster or slower than the recorded rate. In a particular illustrative embodiment, a pitch range of one or more audio elements may be preserved. In a particular embodiment, the processor 414 may execute instructions associated with the presentation module 424 to add white noise between audio elements. In another particular illustrative embodiment, the processor 414 may execute instructions associated with the presentation module 424 to introduce a blank audio spacer between audio elements.

In an illustrative example, the user selected media content includes a recorded soccer game. The processor 414, by scanning the audio data associated with the selected media content, may identify language segments and non-language segments of the media content. The processor 414, executing instructions in the prioritization module 424, may determine that a word "goal" carries substantial information bearing weight relative to the audio data of the selected media content. The processor 414 may identify a plurality of audio elements, some of which include the word "goal" in the audio portion. The processor 414 may provide concatenated portions including concatenated audio elements and concatenated associated portions of the video data. The display device 408 may display the concatenated portions, including audio elements that include the word "goal," and the associated portions of the video data.

Figure 5:
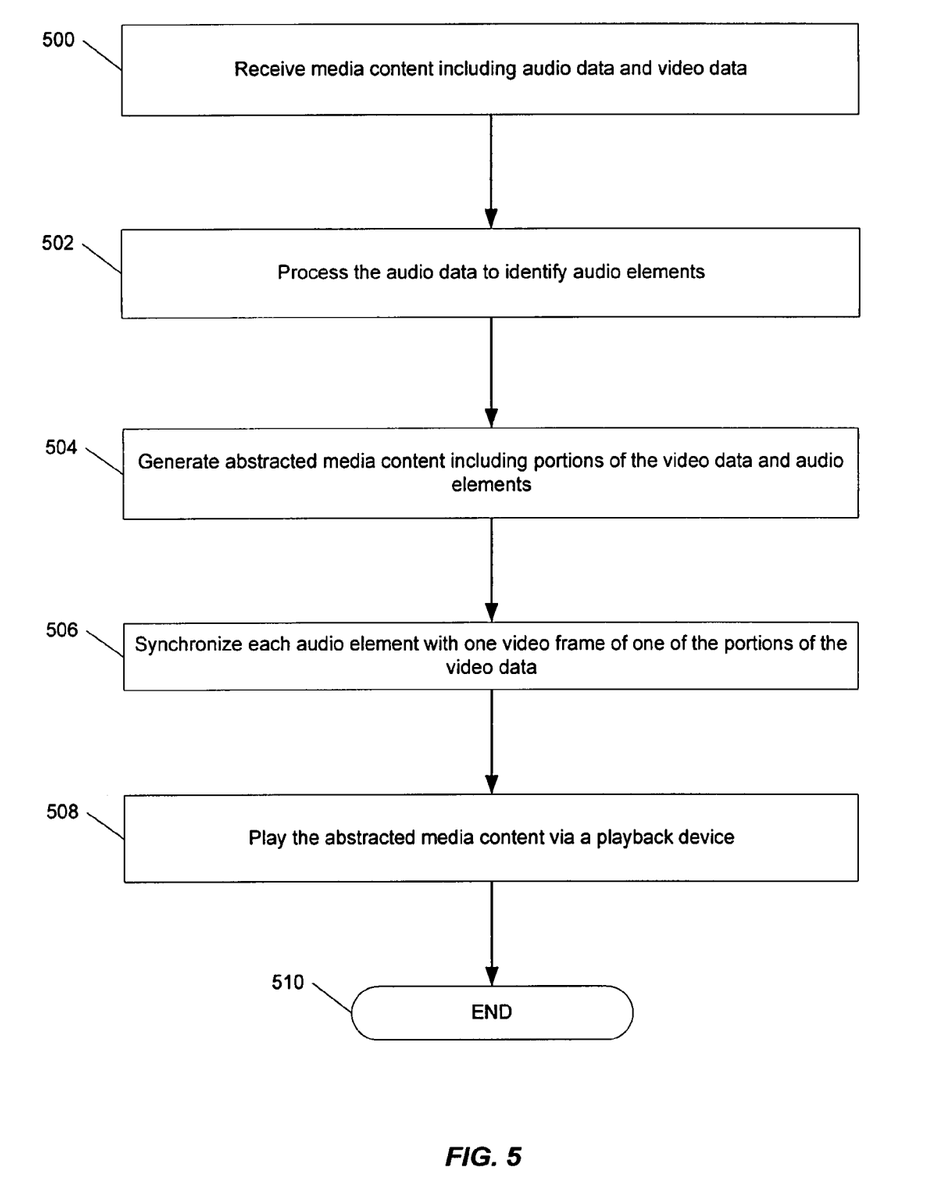
FIG. 5 is a flow diagram of a particular illustrative embodiment of a method of providing modified media content.

FIG. 5 is a flow diagram of a particular illustrative embodiment of a method of providing modified media content. At block 500, the method includes receiving media content including audio data and video data. The video data has a first number of frames. In an illustrative embodiment, the media content may be received at a set-top box device, a network server, a personal computer, a portable electronic device, any other device capable of receiving and processing multimedia data, or any combination thereof. Moving to block 502, the audio data is processed to identify audio elements. Processing can include identifying audio segments of the audio data, assigning a priority value to each audio segment, and identifying as audio elements of the audio data those audio segments having a priority value exceeding a base priority value. Proceeding to block 504, abstracted media content is generated that includes portions of the video data and the audio elements. The abstracted media content includes less video frames than the first number of video frames. Advancing to block 506, in a particular embodiment each audio element is synchronized with a corresponding video frame of the associated portion of the video data included in the abstracted media content. Moving to block 508, in a particular embodiment the abstracted media content is played via a playback device, such that an audio signal associated with the audio data elements is provided. The method terminates at 510.

Figure 6:
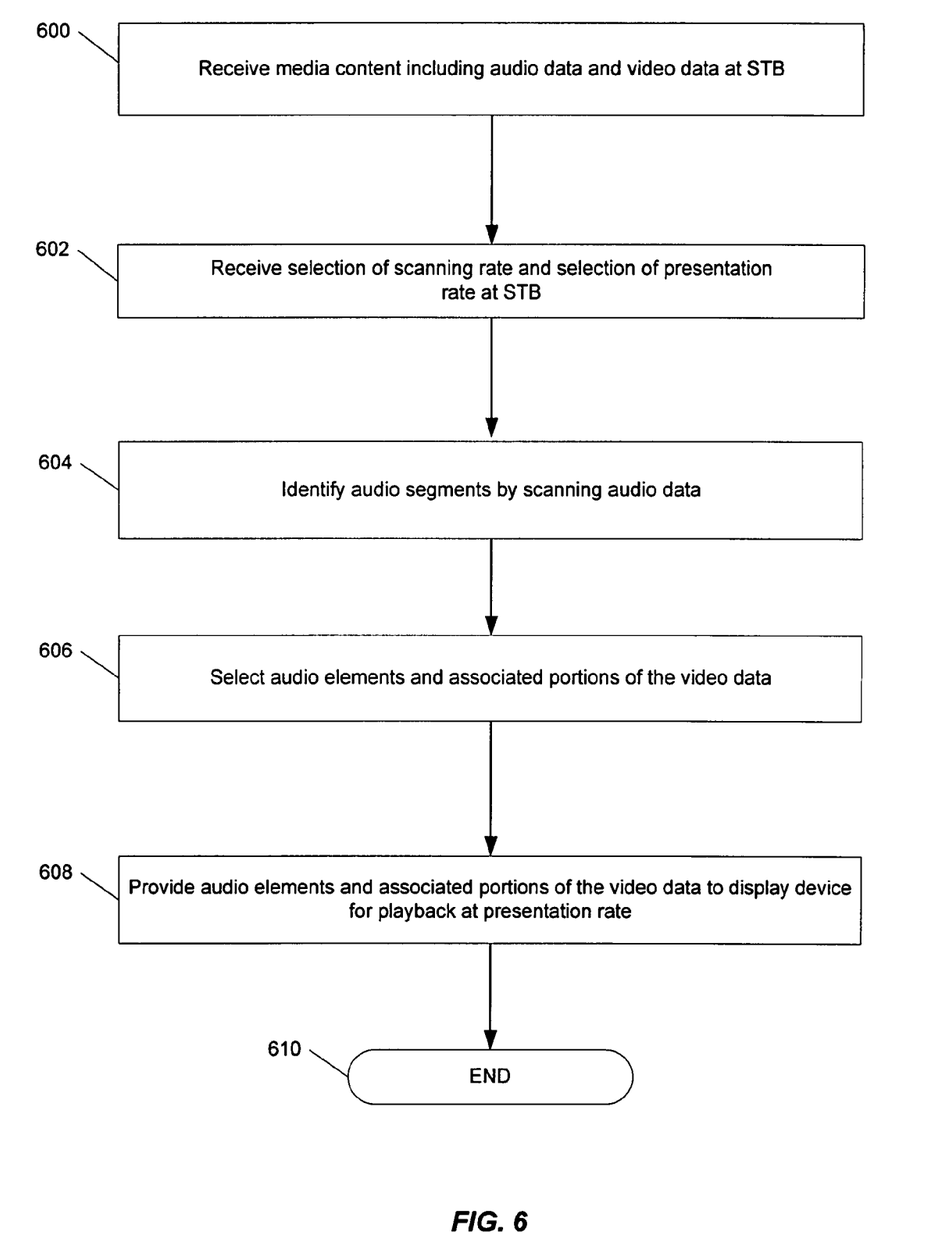
FIG. 6 is a flow diagram of a second particular illustrative embodiment of a method of providing modified media content.

FIG. 6 is a flow diagram of a second particular illustrative embodiment of a method of providing modified media content. At block 600, a set-top box device may receive media content including audio data and video data. Moving to block 602, in a particular illustrative embodiment, the set-top box device may receive a selection of a scanning rate and a selection of a presentation rate. Proceeding to block 604, the set-top box device may identify audio segments, including language segments and non-language segments of the selected media content by scanning audio data at the scanning rate. Each audio segment has an associated portion of the video data. In a particular illustrative embodiment, the scanning rate is at least twice a recorded rate. Moving to block 606, the set-top box device may select audio elements and associated portions of the video data. Moving to block 608, the set-top box device may provide the audio elements and associated portions of the video data to the display device for playback at the presentation rate. In a particular illustrative embodiment, a user may select the presentation rate. The method terminates at 610.

Figure 7:
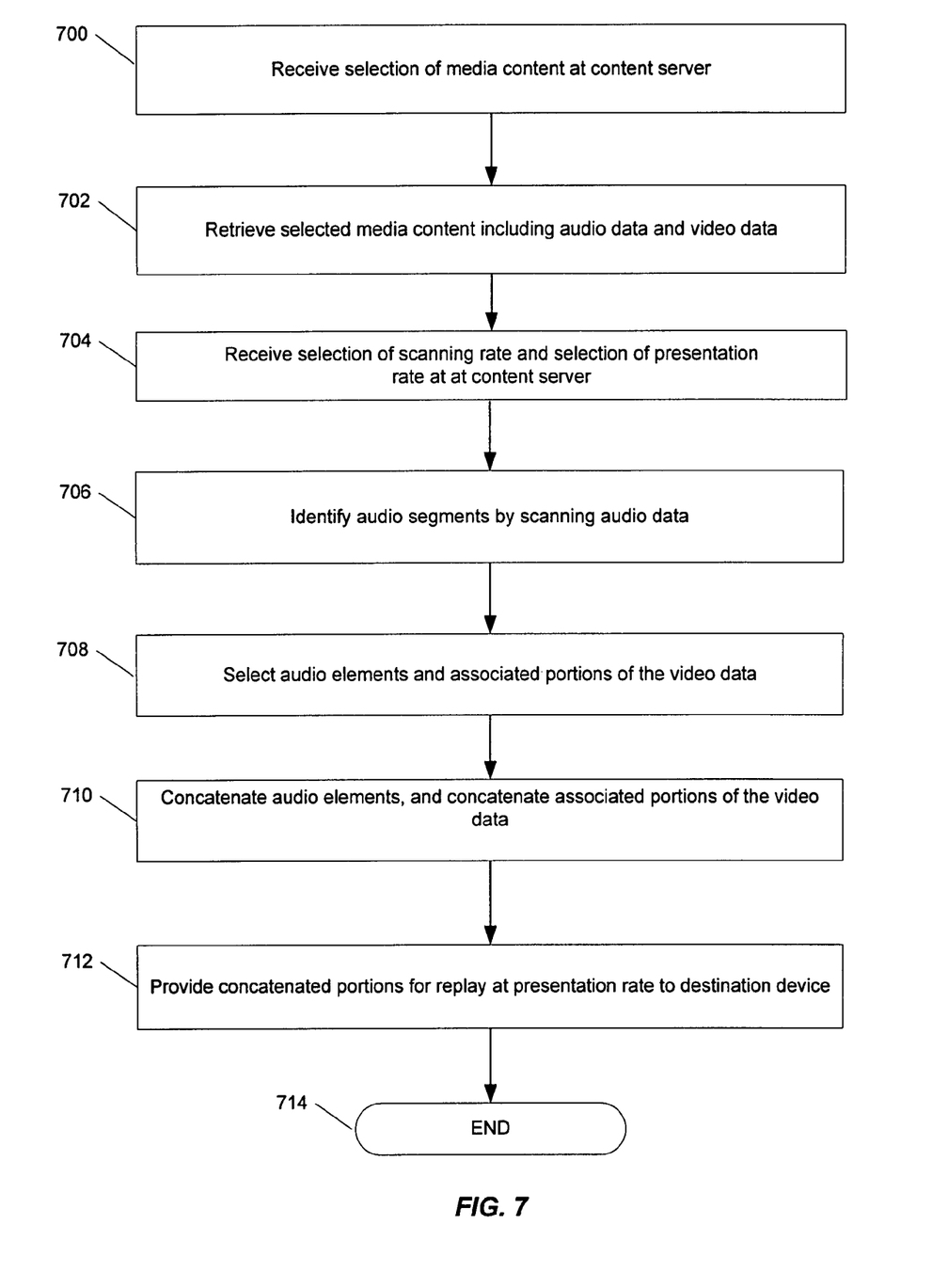
FIG. 7 is a flow diagram of a third particular illustrative embodiment of a method of providing modified media content.

FIG. 7 is a flow diagram of a second particular illustrative embodiment of a method of providing modified media content. At block 700, a content server receives a selection of media content. Moving to block 702, the content server retrieves the selected media content including audio data and video data. Proceeding to block 704, the content server receives a selection of a scanning rate and a selection of a presentation rate. Moving to block 706, the content server identifies audio segments by scanning the audio data. In a particular illustrative embodiment, the scanning rate is at least twice the recorded rate. Proceeding to block 708, the content server selects each audio segment having a priority value that exceeds a base priority value to be an audio element. At block 710, in a particular illustrative embodiment, the content server provides concatenated portions by concatenating audio elements and concatenating the associated portions of the video data. In a particular illustrative embodiment, the content server can synchronize audio elements with associated portions of the video data. Proceeding to block 712, the content server provides the concatenated portions for playback at the selected presentation rate to the destination device. The method terminates at 714.

Figure 8:
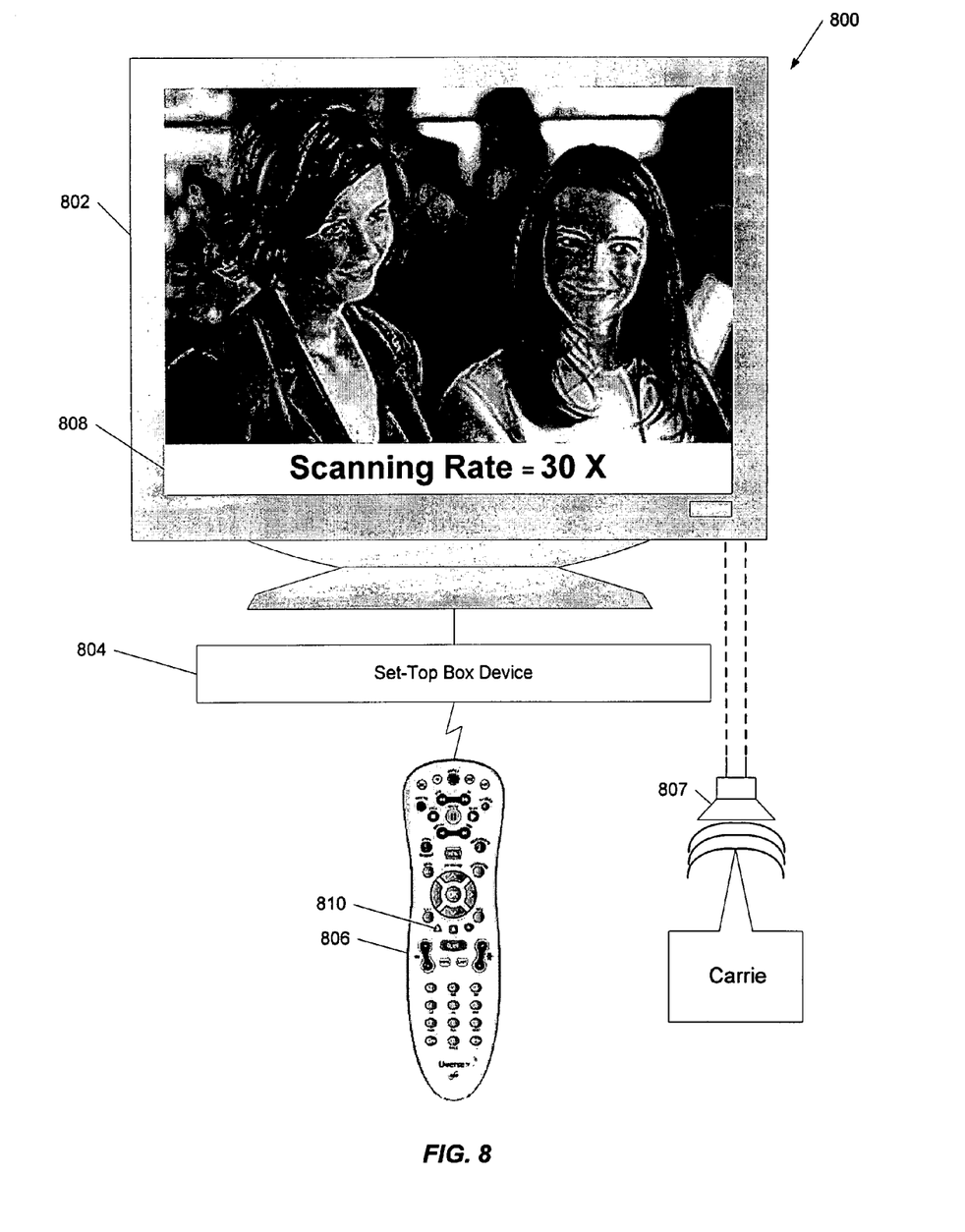
FIG. 8 is a diagram of a particular illustrative embodiment of a user interface to provide modified media content.

FIG. 8 is a diagram of a particular illustrative embodiment of a system adapted to provide a user interface to provide modified media content. The system 800 includes a display device 802, a set-top box device 804, and remote interface 806. The display device 802 includes an audio output device 807.

In an illustrative embodiment, the audio output device 807 may output an audio element while the display device 802 displays an associated portion of video data. In an illustrative example, from the T.V. series "Sex In The City," an audio element includes the name "Carrie." In the associated portion of the video data, Miranda (left) and Charlotte (right) are shown together, saying the name "Carrie." In a particular example, the display device displays a scanning rate 808 to be 30 times the recorded rate. In an illustrative example, a user may select a button 810 that can cause data associated with the scanning rate to be sent to the display device 802, and the scanning rate to be displayed at the display 808. In another illustrative example, the scanning rate may be audibly announced via the audio output device 807, in response to a selection of the button 810.

Figure 9:
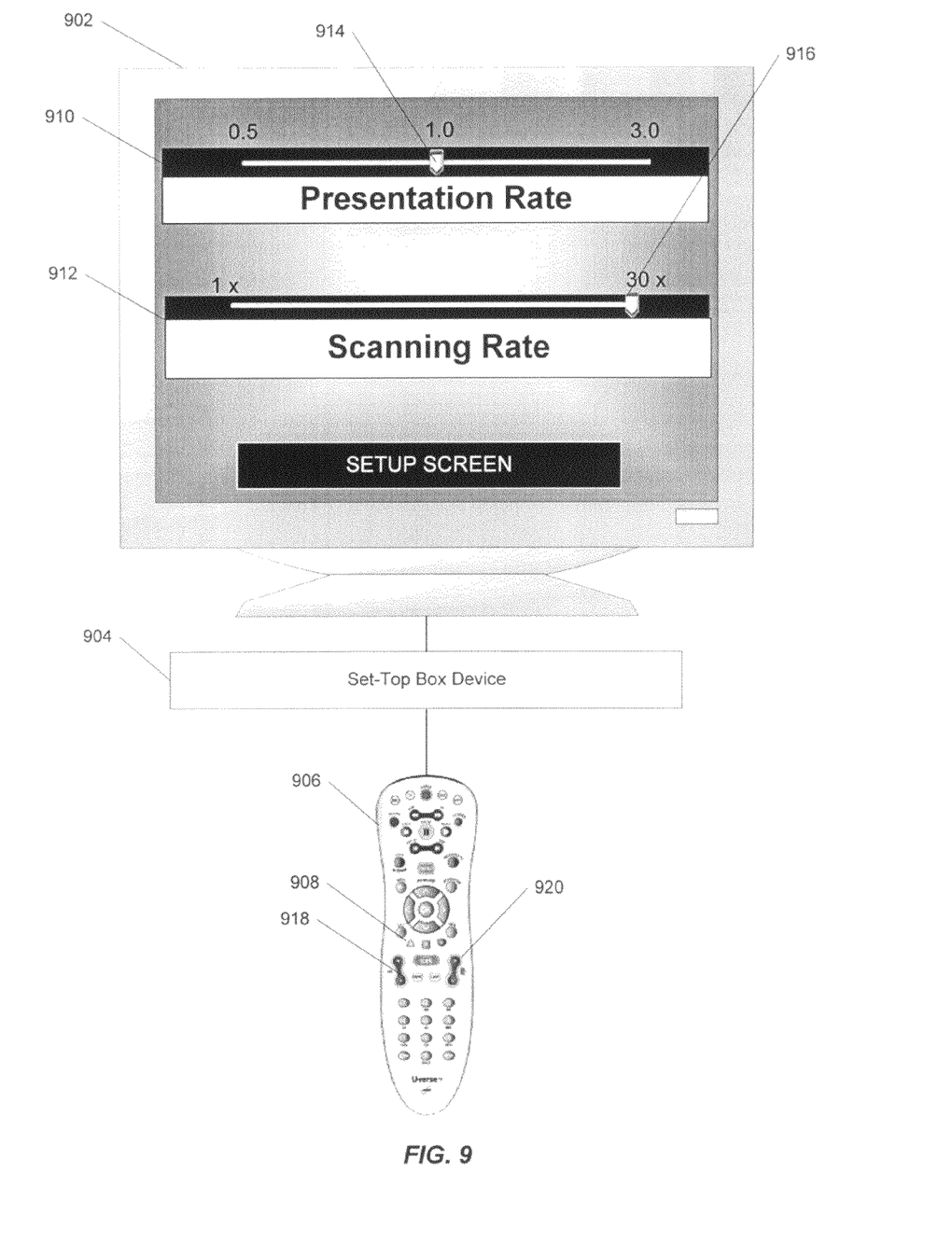
FIG. 9 is a diagram of a second particular illustrative embodiment of a user interface to provide modified media content.

FIG. 9 is a diagram of a second particular illustrative embodiment of a system adapted to present a user interface to provide modified media content. A display device 902 can be coupled to a set-top device 904. The set-top box device may receive input from a remote input device 906. A user may select a display of a set-up screen via the remote input device 906. The set-up screen may include a presentation rate bar 910 and a scanning rate bar 912. The user may adjust the position of a slider 914 or a slider 916 by selecting the presentation rate bar 910 or the scanning rate bar 912 using button 908, and by manipulating a button 918 or a button 920 on the remote interface 906 to change a position of the corresponding slider 914 or 916.

In a particular illustrative embodiment, the presentation rate may have a pre-defined lower limit and a pre-defined upper limit. In a particular non-limiting illustrative example, the presentation rate may range from 0.5 times the recorded rate to 3.0 times the recorded rate.

In a particular illustrative example, the scanning rate may have a pre-defined scanning rate lower limit and a pre-defined scanning rate upper limit. In a particular non-limiting illustrative example, the pre-defined scanning rate lower limit may be one times the recorded rate, and the pre-defined scanning rate upper limit may be thirty times the recorded rate. In another non-limiting illustrative example, the pre-defined scanning rate lower limit may be two times the recorded rate, and the pre-defined scanning rate upper limit may be one hundred times the recorded rate.

In a particular illustrative embodiment, the user interface may have a form that differs from that shown in FIG. 9. The form of the user interface may conform to a user interface for adjusting other variables of the display device, e.g., brightness, contrast, volume, or other variables. For example, a user interface may include a plurality of soft knobs, soft pushbuttons, or other visual, audible, other representations, or any combination thereof.

Figure 10:
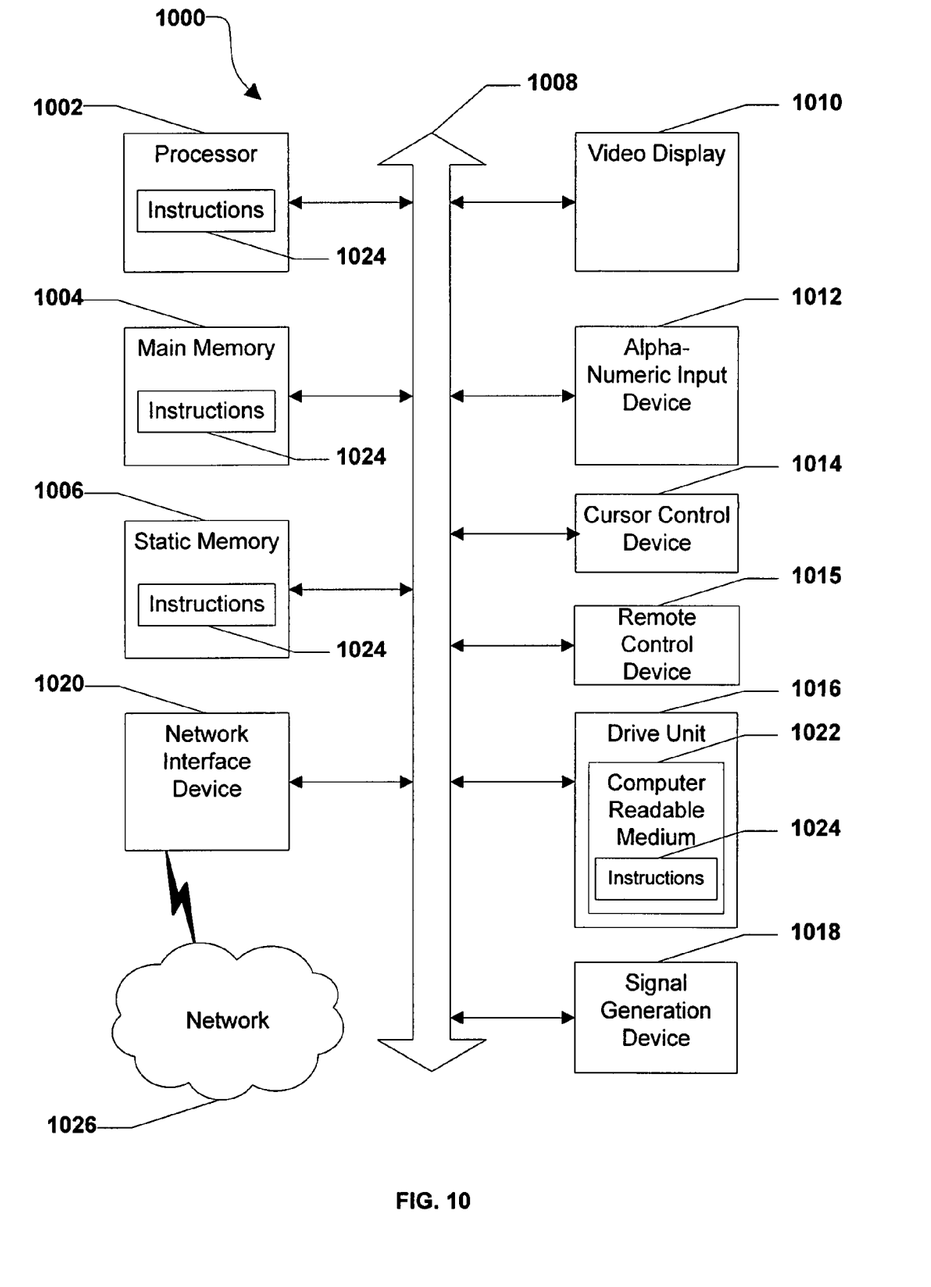
FIG. 10 is a block diagram of an embodiment of a general computer system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000, or any portion thereof, may operate as a standalone device or may be connected, e.g., using a public network, such as the Internet, or a private network, to other computer systems or peripheral devices, including one or more set-top box devices, content sources, or network servers, as depicted in FIGS. 1-4.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006, which can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing modified media content, the method comprising:
   receiving media content, the media content comprising audio data and video data having a first number of video frames;
   identifying audio segments of the audio data, wherein the audio segments include a plurality of language segments that include audio words and a plurality of non-language segments, wherein adjacent language segments are separated by one of the non-language segments;
   assigning a priority value to each language segment, wherein the priority value of a particular language segment is based on one or more first characteristics of one or more words in the particular language segment;
   assigning a priority value to each non-language segment, wherein the priority value of a particular non-language segment is based on one or more second characteristics of the particular non-language segment;
   identifying audio elements, wherein the audio elements include language segments of the plurality of language segments that have priority values that exceed a base priority value and non-language segments of the plurality of non-language segments that have priority values that exceed the base priority value, wherein the base priority value is determined based at least in part on a scanning rate of the audio data, and wherein the scanning rate is greater than a recorded rate of the media content; and
   generating abstracted media content that includes the audio elements and portions of the video data associated with the audio elements.

2. The method of claim 1, further comprising playing the abstracted media content via a playback device, wherein the playback device provides an audio signal corresponding to the audio elements.

3. The method of claim 1, wherein the one or more first characteristics include at least one of information bearing of individual words of the one or more words and prominence based on prosodic correlates to indicate an importance of particular words of the one or more words.

4. The method of claim 1, wherein the abstracted media content includes a second number of video frames and the base priority value is determined based at least in part upon the first number of video frames and the second number of video frames.

5. The method of claim 1, wherein the base priority value is determined at least in part by user input.

6. The method of claim 1, wherein the one or more second characteristics include at least one of a sound volume envelope, a sound volume time derivative, a frequency content, and a time derivative of frequency content.

7. The method of claim 1, wherein the abstracted media content is provided by a set-top box device.

8. The method of claim 1, wherein the media content is received from at least one of an internet protocol television (IPTV) server, a cable network, and a satellite network.

9. The method of claim 1, wherein each of the audio elements is synchronized to a corresponding video frame of the abstracted media content.

10. The method of claim 1, further comprising:
    concatenating the audio elements; and
    concatenating the portions of the video data within the abstracted media content.

11. The method of claim 1, wherein each audio element has a corresponding recorded pitch range, and wherein the method further comprises preserving the corresponding recorded pitch range of at least one audio element.

12. The method of claim 1, wherein the abstracted media content is provided by one of an internet protocol television (IPTV) network, a cable network, and a satellite network.

13. A set-top box device, comprising:
a processor to execute instructions stored in a memory accessible to the processor; and
the memory comprising:
a media content storage to store media content comprising audio data and video data having a first number of video frames; and
an abstracting module comprising instructions executable by the processor to:
identify audio segments of the audio data, wherein the audio segments include a plurality of language segments that include audio words and a plurality of non-language segments, and wherein adjacent language segments are separated by one of the non-language segments;
assign a priority value to each audio segment, wherein the priority value of a particular language segment is based on one or more first characteristics of one or more words in the particular language segment, and wherein the priority value of a particular non-language segment is based on one or more second characteristics of the particular non-language segment, wherein;
identify audio elements of the audio data, wherein the audio elements include language segments of the plurality of language segments with priority values that exceed a base priority value and non-language segments of the plurality of non-language segments with priority values that exceed the base priority value, wherein the base priority value is determined based at least in part on a scanning rate of the audio data, wherein the scanning rate is greater than a recorded rate of the media content; and
generate abstracted media content that includes the audio elements and portions of the video data associated with the audio elements.

14. The set-top box device of claim 13, further comprising a presentation module that includes executable instructions to:
concatenate the audio elements, producing concatenated audio elements;
concatenate the portions of the video data, producing concatenated video portions;
synchronize each of the concatenated audio elements with a corresponding frame of the concatenated video portions; and
provide the concatenated audio elements and the concatenated video portions to a display device.

15. The set-top box device of claim 13, wherein the memory further comprises a processing module comprising executable instructions to:
perform a textual transcription of each language segment.

16. The set-top box device of claim 13, further comprising a network interface to receive the media content from a content source via a video distribution network, wherein the video distribution network comprises one or more of an interne protocol television network, a satellite network, and a cable television network.

17. The set-top box device of claim 13, further comprising an output interface to provide the abstracted media content to a display device.

18. A system comprising:
media content storage to store media content comprising audio data and video data having a first number of video frames;
an abstracting module comprising instructions executable by a processor to:
identify audio segments of the audio data, wherein the audio segments include a plurality of language segments that include audio words and a plurality of non-language segments, and wherein adjacent language segments are separated by one of the non-language segments;
assign a priority value to each audio segment, wherein the priority value of a particular language segment is based on one or more first characteristics of one or more words in the particular language segment and wherein the priority value of a particular non-language segment is based on one or more second characteristics of the particular non-language segment;
identify audio elements of the audio data, wherein the audio elements include language segments of the plurality of language segments with priority values that exceed a base priority value and non-language segments of the plurality of non-language segments with priority values that exceed the base priority value; and
generate abstracted media content that includes the audio elements and portions of the video data associated with the audio elements; and
an output interface to output the abstracted media content to a destination device via a video distribution network.

19. The system of claim 18, further comprising an input interface to receive data related to user-selected media content via the network, wherein the stored media content includes the user-selected media content.

20. The system of claim 18, wherein the abstracted media content comprises a second number of video frames, and wherein the first number of video frames is greater than or equal to approximately twice the second number of video frames.

21. The system of claim 18, wherein the abstracted media content comprises a second number of video frames, and wherein the first number of video frames is greater than or equal to approximately ten times the second number of video frames.

22. A non-transitory computer-readable medium embodying instructions to manipulate a computing platform to:
receive media content, the media content comprising audio data and video data having a first number of video frames;
identify audio segments of the audio data, wherein the audio segments include a plurality of language segments that include audio words and a plurality of non-language segments, and wherein adjacent language segments are separated by one of the non-language segments;
assign a priority value to each language segment, wherein the priority value of a particular language segment is based on one or more first characteristics of one or more words in the particular language segment;
assign a priority value to each non-language segment, wherein the priority value of a particular non-language segment is based on one or more second characteristics of the particular non-language segment;
identify audio elements, wherein the audio elements include language segments of the plurality of language segments that have priority values that exceed a base priority value and non-language segments of the plurality of non-language segments that have priority values that exceed the base priority value, wherein the base priority value is determined based at least in part on a scanning rate of the audio data, and wherein the scanning rate is greater than a recorded rate of the media content; and generate abstracted media content that includes the audio elements of the audio data and portions of the video data associated with the audio elements of the audio data.

23. The non-transitory computer-readable medium of claim 22, further comprising instructions to preserve a pitch range of each of the audio elements at approximately a recorded pitch range, wherein the recorded pitch range is the pitch range of the audio data when replayed at the recorded rate.

24. The non-transitory computer-readable medium of claim 22, wherein the media content is received as one of a downloaded file or streaming media.

25. The non-transitory computer-readable medium of claim 22, further comprising instructions to select the portions of the video data, wherein selections of the portions of the video data are based at least in part upon the audio elements.

* * * * *